United States Patent Office 3,420,935
Patented Jan. 7, 1969

3,420,935
PROCESS FOR EXTRACTING ANTIINFLAMMA-
TORY AND HYPOCHOLESTEROLEMIC PRIN-
CIPLE FROM PLANT SOURCES AND THE
PRODUCT PRODUCED THEREBY
John J. Majnarich, 21707 Bothell Way,
Bothell, Wash. 98011
No Drawing. Continuation-in-part of application Ser. No.
231,453, Oct. 18, 1963. This application Feb. 23, 1965,
Ser. No. 434,706
U.S. Cl. 424—195                                 3 Claims
Int. Cl. A61k 27/14; C07g 17/00

ABSTRACT OF THE DISCLOSURE

A process for extracting an antiinflammatory and hypocholesterolemic principle from plant sources such as *Phalaris arundinacea*, alalfa, red clover, timothy and soya beans, including the steps of solvent extracting the principle from the plant source, concentrating the solvent eluate, separating a clear waxy fraction from the eluate, and separating the principle from the fraction. The separated principle can then be dried to crystalline form.

---

This application is a continuation-in-part of my abandoned application Ser. No. 231,453, filed Oct. 18, 1963.

This invention relates to a novel compound, and to a method of producing the novel compound, and valuable by-products if desired, from natural sources.

It has been known that numerous sterols occur naturally, normally in complex mixtures with other compounds such as fatty glycerides, fatty acids, resins, etc. Methods involving solvent fractionation and other techniques have been used to recover these compounds in crude and relatively pure forms.

In accordance with the present invention a novel compound hereafter referred to as H-M Factor is recovered from a raw material by a process comprised of a novel combination of process steps.

Of particular importance is the arrangement of process steps in proper order, and in the preferred form of the invention, the particular raw material used. It has been discovered that a certain grass, which will be described below, produces a surprising yield of H-M Factor.

H-M Factor is produced in a relatively pure white crystalline form by the present process and has been found to be useful as an orally active antiinflammatory in animals. As determined by the Selye granuloma pouch technique, H-M Factor exhibits an antiinflammatory character greater than hydrocortisone. Moreover, where hydrocortisone ordinarily raises blood cholesterol level, the present compound actually lowers the blood cholesterol level, has been tested and found to have no toxic effects, serves as a nutrient in increasing the energy, stamina and work performance of animals and increases their capacity to resist exposure and stressor agents.

Accordingly, it is a primary object of the present invention to provide a novel compound and a method of its production. Another object is to provide a raw material for use in the process of this invention in recovering surprisingly large amounts of H-M Factor. Other objects and advantages of this invention will become apparent to those skilled in this art from the following description of the best mode for carrying out the present invention and examples thereof, and the appended claims.

In general, H-M Factor is obtained in accordance with the present invention in the following manner. First a suitable raw plant material is selected and formed into a meal, for example by harvesting dehydrating, and milling or otherwise comminuting. An H-M Factor containing fraction is then extracted from the meal and interfering pigments removed from the extract. The resulting clear, slightly yellow, waxy lipid fraction containing the active principle is then dried, dissolved in a suitable water insoluble solvent, washed, and the dissolved H-M Factor fraction separated and evaporated to effect crystallization of H-M Factor in a relatively pure state.

Several raw materials have been found to yield H-M Factor such as alfalfa, red clover, timothy and soya beans. However, it has been discovered that an outstanding source is a grass commonly known as Reed Canary Grass (botanical name *Phalaris arundinacea*). This grass is a tall perennial with coarse stems and broad leaves. It thrives in the northern states on land too wet for other cultivated grasses. For reasons unknown to date, the *Phalaris arundinacea* grown on a specific tract known as the Hunza Farm in Duvall, Wash., and referred to as Hunza Grass (a registered trademark) produces better yields than may be obtained from *Phalaris arundinacea* grown in other locations. It is a nonlegume. Hunza Farm is located near the confluence of Cherry Creek and the Snoqualmie River, and occupies approximately 400 acres in Section 7, Township 26 North, Range 7 East, King County, in the State of Washington. Of possible significance in explaining the relatively large yield of H-M Factor by Hunza Grass, is that the Hunza Farm is ordinarily inundated to a depth of 2.5 feet. Under normal flood circumstances little or no sand size material is carried in by the slowly moving flood water which remains long enough each winter to permit suspended colloidal clay and fine silt particles to settle on the land, underneath the dissolved ions contained in the flood water. The particles are therefore available for ion exchange with the clay and organic matter in the soil during several months of flooding. The Hunza Farm site is an old peat bog, which gives a high organic level. Organic soils possess high cation exchange and low binding energy.

The approximate composition of Hunza meal is as follows:

| | |
|---|---|
| Protein | percent__ 19.5 |
| Fiber | do____ 18.2 |
| Fat | do____ 3.7 |
| Carotene (120,000 i.u./lb.) | p.p.m__ 150 |
| Chlorophylls | percent__ 1.0 |

The following is a specific example of the best mode of carrying out the present invention.

*Phalaris arundinancea* was cut during the summer months between April and September to a length of 3–4 inches. Thereafter the grass was formed into a meal in a hammer mill and dehydrated, the dehydrator having an outlet temperature of approximately 100–110° C. No screening of the course fibers is necessary. Extraction of the H–M Factor containing fraction from the meal was carried out in a Soxhlet extractor using ethylene dichloride with 10% chloroform, at a rate of 8 liters of the solvent per 11.0 lbs. of meal. Two liters were initially added as a moistener followed by the remaining 6 liters. The solvent eluate was concentrated from 12.0 liters to 500 ml. by evaporation in vacuo at 40–42° C. (15–18 inhces of Hg) giving it a green, highly colored appearance. Thereafter, interferring pigments such as carotenes, xanthophyls and chlorophyl were separated from the solvent eluate by column chromatography. Thus, the solvent eluate was poured on top of and passed down through a column of charcoal without any adjustment of pH. The charcoal was 24 inches long and 4 inches in diameter, and was packed with activated norite. The solvent eluate separated into a slightly yellow, waxy lipid fraction containing H–M Factor, and a pigmented fraction containing the carotenes, xanthophyls and chlorophyl. Solvent used in the initial separation phase was used to force the concentrated solvent eluate downward through the column at a rate of 1.5 to 1.7 liters of solvent per 500 ml. of concentrated eluate. Collection of the clear lipid fraction was effected before the carotenes began to appear, the latter preferably being used in practice to indicate when termination of lipid fraction collection should occur. Next, the lipid fraction was separated by solvent fractionation (into a fraction which will yield substantially pure crystalline H–M Factor and a second fraction containing estrogenic coumestrol) by concentrating the lipid fraction to dryness in the form of an amorphous precipitate which was then taken up in chloroform at a rate of 20 ml. of solvent per 1.2 liters of lipid fraction before evaporation, and thereafter washed twice with 20 mls. of 0.2 N sodium bicarbonate in a separatory funnel. The chloroform eluate was then taken to dryness on a water bath, at which time spontaneous crystallization of H–M Factor occurred.

H–M Factor has a melting point of 305° C. (Fischer Melting Point Block), crystallizes into a white needle form, when recrystallized from ethanol, is water insoluble and soluble in organic solvents, i.e., chloroform, ether, petroleum ether, naphtha, ethyl acetate, alcohols (methanol, ethanol, isopropyl, normal butanol), gives a bright blue fluorescence in acid solution, no fluorescence in weak or strong alkaline solutions, ultraviolet absorption spectra (methanol solvent) maxima at 242 and 342 Mu as determined with a Beckman DU spectrophotometer.

Molecular weight _____ 277
Carbon analysis _____percent__ 65
Oxygen _____do____ 23.1
Hydrogen _____do____ 6.5
Nitrogen _____do____ 5.4

In the solvent extraction phase, of the preferred process of this invention, it will be helpful although not necessary to initially add solvent at the rate of 2 liters, followed by 6 additional liters, per 11.0 lbs. of meal. More or less solvent may be used. However, the yield will drop off with a decrease in solvent while an increase will not proportionately increase the yield. For example, 16 liters of ethylene dichloride with 10% chloroform will increase the H–M Factor yield by less than 1%. Any suitable extraction apparatus may be used, to extract H–M Factor along with other interferring materials, however, extraction with hot solvents results in yields 2–8% better when passed over the meal at or near their boiling point. A Soxhlet extractor has therefore been found preferable, although the meal has been successfully extracted for example, by percolation for about 24 hours at room temperature (20–40° C.) after which the solvent is run off and the meal residue washed again with approximately the same amount of solvent to remove the remaining fatty material.

For extraction purposes, any lower organic solvent may be used although ethylene dichloride with 10% chloroform is preferred. The following is a list of the best solvents accompanied by the respective yields of H–M Factor when used in the above described percolation extraction process.

Solvent: Yield (grams)
Acetone _____ 1.8
Ethyl ether _____ 1.5
Methyl alcohol _____ 1.2
Ethyl alcohol _____ 0.9
Isopropyl alcohol _____ 0.5
N-butyl alcohol _____ 0.7
Petroleum ether (B.P. 30–60° C.) _____ 1.5
Naphtha (B.P. 60–80° C.) _____ 1.9
Chloroform _____ 1.7
Ethylene dichloride _____ 2.2
Ethanol, 10% chloroform _____ 1.0
Methanol, 10% chloroform _____ 1.1
Ethylene dichloride, 10% chloroform _____ 2.1

In contrast with the performance of Hunza Grass indicated above, the following yields of H–M Factor were obtained from other raw materials using the same initial weight and ethylene dichloride in the solvent extraction phase.

Yield (grams)
Alfalfa meal _____ 0.01
Reed Canary Grass other than from the Hunza
  Farm _____ 0.10
Red clover _____ 0.02
Timothy _____ 0.04
Soya beans _____ 0.07

In the chromatographic separation phase, instead of charcoal with or without activated norite, any suitable material capable of effecting the desired separation may be used. Columns packed with calcium carbonate and silica gel are examples of such other materials.

In carrying out the solvent fractionation, the lipid fraction is concentrated to dryness in the form of an amorphous precipitate and taken up in a suitable water insoluble solvent such as chloroform or any of the other lower organic solvents such as those mentioned above with the exception of the alcohols. The amount of solvent is not critical, the only function thereof being to resuspend the solids.

After taking the H–M Factor fraction up in a water insoluble solvent, washing may be carried out by a basic material capable of promoting formation of two distinct fractions in a separatory funnel or other suitable device, one fraction of which is dissolved H–M Factor.

Instead of sodium bicarbonate other alkali metal salts may be used such as, for example, sodium hydroxide, calcium hydroxide, potassium hydroxide or potassium carbonate ammonium hydroxide, sodium phosphate (dibasic), calcium hydroxide, and other basic materials capable of bringing the pH to 8.5 or higher. As an alternative separation, once the amorphous precipiate is taken up in the chloroform, it may be washed with hot water and later acidified to a pH under 3.5 by a diluted mineral acid, as for example, sulphuric acid.

Biological assay of H–M Factor using the Granuloma Pouch technique as a measure of antiinflammatory activity was performed as follows:

A pneumoderma was made by injecting air into the middle of the drosal skin of male rats. Croton oil was injected into the resulting pouch and the air withdrawn the following day. Seven days after preparation of the pouch the animals were sacrificed and the weight of the animals was determined as well as the volume of exudate in the pouch. The technique used and further details of the method are found in Robert & Nezamis, The Granuloma Pouch as a Routine Assay for Antiphlogistic Compounds, Acta Endocrinologica 25: 105–112, 1957.

In a study the controls were fed 0.5 ml. of cottonseed oil daily. All the supplements were fed in the same volume of oil.

| No. rats | Supplement | Wt. gain, gms. | Adrenal, wt., mg. | Ml. Eluate | Serum, cholesterol, mg./100 cc. |
|---|---|---|---|---|---|
| 10 | 0 | 14.3 | 41.3 | 15.1 | 224 |
| 10 | 500 mcg. hydrocortisone | 10.7 | 36.2 | 3.4 | 304 |
| 10 | 10 mcg. H-M factor | 18.4 | 40.2 | 5.1 | 174 |

It is apparent that H–M Factor is about fifty times more effective than hydrocortisone in reducing inflammation. Also of considerable importance is the lowered blood cholesterol.

The dosage of H–M Factor in various tests ranged from 2.5 mg. to 25 mg. per kilo body weight of the rats. The optimum dose range was 5 to 10 mg. per kilo body weight.

What is claimed and desired to be secured by Letters Patent is:

1. A process for producing an active principle from *Phalaris arundinacea* grass, alfalfa, red clover, timothy and soya beans, said process comprising:
    (a) solvent extracting said active principle by an organic solvent selected from the group consisting of acetone, ehtyl ether, methyl alcohol, ethyl alcohol, isopropyl alcohol, N-butyl alcohol, petroleum ether, naphtha, chloroform, ethylene dichloride, and mixtures thereof from the plant source into a solvent eluate;
    (b) concentrating the solvent eluate;
    (c) separating a clear, waxy lipid fraction containing said active principle from the eluate by chromotography and by organic-solvent fractionation;
    (d) separating the dissolved active principle from the fraction by washing the fraction with an alkali metal salt solution bringing the pH to at least 8.5; and
    (e) drying the separated active principle to crystalline form.

2. A process for producing an active principle from *Phalaris arundinacea* grass, alfalfa, red clover, timothy, and soya beans, said process comprising:
    (a) solvent extracting said active principle from the plant source into a solvent eluate by a lower organic solvent selected from the group consisting of acetone, ethyl ether, methyl alcohol, ethyl alcohol, isopropyl alcohol, N-butyl alcohol, petroleum ether, naphtha, chloroform, ethylene dichloride, and mixtures thereof;
    (b) concentrating the solvent eluate by evaporation;
    (c) separating a clear, waxy lipid fraction containing said active principle from the concentrated eluate by chromatography and by organic-solvent fractionation;
    (d) separating the dissolved active principle from the fraction by washing the fraction with an alkali metal salt solution bringing the pH to at least 8.5; and 3. The active principle produced by the process according to claim 1.

References Cited

Bickoff Science, vol. 126, pp. 969–970, 1957.
Bradbury Journal of the Chemical Society 1951, pp. 347–49, 1951.
Walter Journal of the American Chemical Society, vol. 63, pp. 3273–3276, 1941.
Wilkinson Chemical Abstracts, vol. 53, Col. 426, Abstracting Journal of the Chemical Society, 1958, Part II, pp. 2079–2081.

ALBERT T. MYERS, *Primary Examiner.*

L. B. RANDALL, *Assistant Examiner.*